United States Patent [19]

Rhodes

[11] 4,313,205

[45] Jan. 26, 1982

[54] CARRIER SYNCHRONIZATION AND SYMBOL SYNCHRONIZATION FOR OFFSET-QPSK BURST COMMUNICATIONS

[75] Inventor: Smith A. Rhodes, Chantilly, Va.

[73] Assignee: Communications Satellite Corporation, Washington, D.C.

[21] Appl. No.: 166,288

[22] Filed: Jul. 7, 1980

[51] Int. Cl.³ .................... H04L 27/22; H03D 3/02
[52] U.S. Cl. ........................... 375/86; 375/85
[58] Field of Search .................. 375/86, 85, 39, 81, 375/54; 329/124

[56] References Cited

U.S. PATENT DOCUMENTS

| | | | |
|---|---|---|---|
| 4,057,759 | 11/1977 | Genova | 375/86 |
| 4,083,009 | 4/1978 | Bickford | 375/86 |
| 4,085,378 | 4/1978 | Ryan | 329/124 |
| 4,092,606 | 5/1978 | Ryan | 375/54 |
| 4,180,779 | 12/1979 | Hook | 375/86 |

*Primary Examiner*—Howard Britton
*Attorney, Agent, or Firm*—Sughrue, Mion, Zinn, Macpeak & Seas

[57] ABSTRACT

In a TDMA burst preamble, the phase is varied between $\pm\pi/4$ radians, and carrier synchronization is achieved by averaging the phase over a given interval. Symbol timing synchronization is achieved by filtering the upper sideband of a conventional delay-and-multiply circuit and demodulating the filtered upper sideband with a coherent carrier available by the end of the preamble. After the preamble, modulation removal is used to obtain the unmodulated carrier.

10 Claims, 5 Drawing Figures

CARRIER SYNCHRONIZATION AND SYMBOL SYNCHRONIZATION FOR OFFSET-QPSK BURST COMMUNICATIONS

BACKGROUND OF THE INVENTION

This invention is related to carrier phase and symbol timing acquisition in time division multiple access (TDMA) burst communications and, or particularly, to the simultaneous acquisition of carrier phase and symbol timing synchronization from the preamble and and continued steady-state synchronization during the message burst of offset quaternary phase shift keying (O-QPSK) burst communications.

The modulation scheme usually employed in TDMA Satellite communications systems is conventional QPSK in which an in-phase carrier and quadrature carrier are each modulated with information and the modulated carriers are then combined into a single signal for transmission. A simplified block diagram of a QPSK signal generation technique is shown in FIG. 1 in which a carrier signal generator 10 provides one carrier signal to the input of multiplier 12 and also provides one input to the multiplier 14 through a 90 degree phase shift circuit 16. A timing signal generator 18 provides its output to a bit sequencer 20 which provides the polarity designations A and B to the mixers 12 and 14, respectively. Even and odd numbered information bits are conveyed by A and B, respectively, where a +1 corresponds to a logical "zero" and a 1 corresponds to a logical "one" for an information bit. The transition times for the polarity designations Â and B̂ are coincident.

Because only a single transmission is present at any time for a TDMA satellite transponder, it is feasible to operate the transponder at power saturation. However, problems arise with the use of QPSK signaling with non-linear satellite channels if the signal has significant spectral band limiting.

There are at least two basic conflicting features in TDMA satellite communications. First, the channel is non-linear and has a power constraint based upon peak rather than average capability. In order to take advantage of peak power capability, it is necessary for the signal to have an envelope that is nearly constant. However, the second feature of TDMA satellite communications is that the signal spectrum must be effectively truncated by filtering to avoid significant levels of out-of-band interference. For many modulation techniques, the intersymbol interference caused by filtering causes the envelope to have large variations. When the envelope variations are removed by either intentional amplitude limiting or by the limiting characteristic of the nonlinear channel, spectral side lobes are regrown that virtually remove the bandwidth constraint that was imposed by filtering. Thus, spectral band-limiting and constant-envelope signaling are incompatible for most modulation techniques when the satellite transponders and/or transmitter power amplifiers are operated in the non-linear regions near power saturation.

A necessary constraint on a transmission in order for it to accommodate both spectral band limiting and constant envelope is that band-limiting be accomplished by avoiding rapid phase transitions. In practical terms, this constraint must be imposed by a prohibition of polarity reversals or phase shifts of $\pi$ radian values. Such a $\pi$ phase shift occurs for conventional QPSK signals when both binary modulation components undergo transitions.

Due to this drawback in the use of QPSK signaling, an alternative modulation scheme referred to as "offset QPSK" (O-QPSK) is sometimes employed. In O-QPSK the timing of the binary sequences used to modulate the quadrature carrier components is staggered so that only one component at any one time may have a transition. Consequently, the phase shifts for O-QPSK are restricted to $\pm \pi/2$ radians. Filtering still results in considerable envelope variation of an O-QPSK transmission, but most of the spectral band limiting is manifested as a gradual rather than instantaneous phase shift when a bit transition occurs. Therefore, an O-QPSK signal can retain most of the spectral constraints imposed by filtering even if the envelope is restored to a constant value by either intentional means or by the saturated transponder response.

Although certain problems are solved by the use of O-QPSK, additional problems have been encountered in obtaining carrier phase and symbol timing synchronizations. The typical format for conventional TDMA/QPSK is to use a preamble to each burst that has alternating bit values for both binary modulation sequences A and B. Such a preamble allows the same overhead to be utilized for the acquisitions of both carrier phase and symbol timing. Usually, the carrier synchronization is obtained by double-squaring (4th power non-linearity) to remove the QPSK modulation, followed by a tuned filter at the fourth harmonic of the carrier and a divide-by-four zero-crossing counter. Symbol timing is obtained in parallel with carrier phase being acquired by a separate operation that employs a delay-and-multiply scheme and a filter tuned to the QPSK symbol rate $R_s$. The delay is of one-half symbol duration, or $0.5/R_s$.

FIG. 2 illustrates a typical TDMA/QPSK synchronization scheme. The received QPSK signal is supplied to a filter 30 which is tuned to the carrier frequency $f_c$, and the output of the filter 30 is supplied, in order, through a double squaring circuit 32, a filter 34 tuned to $4f_c$ and a divide-by-four circuit 36. The output of the divide-by-four is supplied to a mixer 38 as the in-phase carrier for demodulation of the A-channel information, and it is also supplied through a 90 degree phase shifter 40 to the mixer 42 as the quadrature carrier for demodulation of the B-channel information. The outputs of mixers 38 and 42 are provided to respective lowpass filters 44 and 46 which are used for noise reduction, and the outputs of these filters are provided to sample-and-hold circuits 48 and 50. The sample and hold circuits are clocked by timing pulses synchronized to the symbol rate, and threshold detectors 52 and 54 provide the decoded bit decisions Â and B̂.

In order to acquire symbol timing synchronization, the output of filter 30 is also provided as inputs to a mixer 56 and one-half symbol delay 58, the output of the delay 58 providing the second input to the mixer 56. The output of mixer 56 is provided to a filter 60 tuned to the QPSK symbol rate R and then to a timing pulse generator 62 which generates symbol rate timing pulses used to clock the sample-and-hold circuits 48 and 50.

For conventional QPSK, the two modulation sequences A and B have timing coincidence, and the transmission is defined by:

$$S(t) = \sqrt{2C} \, [A \cos(w_c t + \theta_c) + B \sin(w_c t + \theta_c)]$$

where C is the carrier power. During the preamble, the bit sequences A and B are coincident (A=B) and both sequences are alternating between +1 and −1 values. Consequently, the phase of the carrier will alternate between +45 degrees ($\pi/4$) and −135 degrees ($-3\pi/4$) during the preamble. Thus, the preamble is a form of binary phase shift keying (BPSK). Double-squaring of the QPSK signal and multiplication by −1 will result in all possible QPSK phase angles of ±45 degrees and ±135 degrees being rotated to 0 degrees, thereby producing an unmodulated signal at the fourth harmonic of the carrier. For the biphase preamble, however, only a single squaring in addition to a phase shift of −90 degrees will be required to remove the modulation, since the phase takes on only two values during that interval. Therefore, it is possible to acquire a carrier phase reference without the use of a fourth-power operation.

After squaring is used to acquire carrier phase during the BPSK preamble, a carrier reference will be available for coherent demodulation. Further, symbol timing will have been acquired, and bit decisions can be made. Note that if the carrier synchronizer of FIG. 2 is modified to include only a simple squaring circuit plus a −90 degree phase shift as discussed above, a coherent demodulated carrier can be obtained from the BPSK preamble, but the QPSK signal following the preamble will not be completely demodulated. Decision feedback (DFB) of the bit decisions can be used to remove the residual BSPK modulation in the signal at the second harmonic of the carrier that is obtained from squaring the QPSK transmission, so that squaring plus DFB allows carrier phase to be tracked throughout the remainder of the QPSK burst. TDMA system timing can be used to control the time at which DFB is employed, and the accuracy of switching to DFB is within a few symbol intervals, or a threshold detection on the output level of the carrier synchronizer filter can be used to control the DFB switch. Alternatively, the unique word at the end of the preamble may be designed such that its modulation scheme is only capable of occupying two states. In this way, the DFB need not be started until after the unique word, and a unique word detection signal could be used to trigger the DFB switch.

FIG. 3 is a block diagram of a typical TDMA/QPSK synchronization technique that employs squaring plus DFB for modulation removal, with similar components being designated by the same reference numerals as in FIG. 2. Instead of the fourth power circuit 32, 4$f_c$ filter 34 and divide-by-four circuit 36 in FIG. 2, the synchronization system of FIG. 3 squares the output of filter 30 in a mixer 70 and passes the output of mixer 70 through a filter 72 tuned to twice the carrier frequency. The output of filter 72 is provided through a delay adjustment 74 and phase adjustment 76 to one input of a mixer 78. During the preamble, the second input to mixer 78 is merely a +1 signal from the terminal P of switch 80, and the output of mixer 78 is provided through a filter 82 tuned to twice the carrier frequency, to a divide-by-two circuit 84 to obtain the coherent reference signal and, finally, to the mixer 38 and 90 degree phase shifter 40.

During the biphase preamble, squaring alone is employed for modulation removal, and after the preamble, squaring and DFB are employed with DFB being implemented in a simple re-modulation scheme. Squaring allows the carrier to be acquired at the second harmonic rather than at the fourth harmonic as is required for a fourth-power operation in FIG. 2 and, with low signal-to-noise $E_b/N_o$, squaring for modulation removal allows carrier phase synchronization to be obtained with much shorter preambles than when a fourth-power operation is employed. Further, there is a phase ambiguity of M states when an Mth-order non-linearity is used for modulation removal, and the ambiguity and carrier phase synchronization must be removed by detection of the phase state of a complex synchronization word or avoided by differential coding or other means. By creating only a two-state ambiguity, the use of squaring rather than fourth-power operation simplifies the ambiguity resolution.

The acquisition of symbol timing synchronization will now be described. If a and b denote the half-symbol delayed versions of the binary modulation sequences A and B, respectively, the two inputs to the mixer 56 are:

$$V_1(t) = A \cos(w_c t + \theta_c) + B \sin(w_c t + \theta_c)$$

$$V_2(t) = a \cos(w_c t + \theta_c) + b \sin(w_c t + \theta_c)$$

hence, the multiplier output is:

$$V(t) = V_1(t)V_2(t) = \frac{aA + bB}{2} + \frac{aA - bB}{2} \cos(2w_c t + 2\theta_c) + \frac{bA + aB}{2} \sin(2w_c t + 2\theta_c)$$

Both aA and bB yield signals that can be filtered to obtain a timing signal, and since the A and B sequences have timing coincidence, the sum (aA+bB) is constructive. Accordingly, the lower side band of the product $V_1 V_2$ is passed through a filter 60 that is tuned to the symbol rate $R_s$ and is used to trigger timing pulses.

Although the above-described synchronization schemes work well for conventional QPSK, they cannot be used for O-QPSK synchronization. Due to the staggered timing of the bit sequences A and B, the products aA and bB will add destructively. Thus, although (aA+bB) is suitable for obtaining symbol timing for conventional QPSK, it is not at all suitable for symbol timing synchronization in O-QPSK. For O-QPSK, the desired signal for symbol synchronization would be (aA-bB). Note that (aA-bB) is the magnitude function for the cosine waveform at the second harmonic. Consequently, the correct signal for symbol synchronization on an O-QPSK transmission is superposed onto the carrier waveform. This interweaving of symbol timing and carrier phase into the same waveform is a characteristic of staggered QPSK, and one approach to synchronization for offset QPSK is to recognize the dependence of the carrier and symbol synchronization functions and not attempt to do independent synchronzations of each function. However, this requires that the carrier phase and symbol timing synchronization be acquired serially, and a longer preamble will be required. Rhodes et al "Computer Simulation of a Digital Satellite Communications System Utilizing TDMA and Coherent Quadriphase Signalling", *Proceedings of ICC*, 1972, pages 34-19 to 34-24, disclose a synchronization technique for O-QPSK in which carrier phase and symbol timing are updated during each TDMA burst rather than reacquired. Such a technique, however, will not be acceptable in reacquiring carrier phase and symbol timing for each burst, since the use of this technique would require serial acquisition of carrier phase and symbol timing. This technique is wasteful of overhead, with an unmodulated portion of the preamble required to acquire carrier phase before symbol timing can be acquired on a modulated portion of the preamble.

Rhodes, "Carrier Synchronization Techniques for Offset-QPSK Signals", *National Telecommunications Conference Record* San Diego, Dec. 2–4, 1974, pages 937–945 and Simon et al, "Offset Quadrature Communications With Decision Feedback Carrier Synchronization", *IEEE Transactions on Communications,* Vol. COM-22, No. 10, October 1974, pages 1576–1584, disclose synchronization techniques designed for O-QPSK signalling with continuous transmissions. However, synchronization circuits for continuous O-QPSK transmissions are not directly applicable to burst communications. In general, synchronization circuits for continuous transmissions have slow acquisition characteristics that would be inefficient for burst communications because of long preamble requirements.

SUMMARY OF THE INVENTION

It is an object of this invention to provide a technique for acquiring carrier phase and symbol timing synchronization on each O-QPSK burst.

It is a further object of this invention to acquire O-QPSK carrier phase and symbol timing synchronization simultaneously to thereby minimize the preamble overhead.

Briefly, these and other objects are achieved according to the present invention by acquiring carrier phase and symbol timing synchronization simultaneously from a modulated preamble that alternates in phase between $+\pi/4$ and $-\pi/4$ radians. During the preamble, the phase offset will have a mean value of 0 degrees as it alternates between $-\pi/4$ and $\pi/4$. Envelope limiting and filtering will cause the offset QPSK signal to approximate a continuous phase frequency shift keying (FSK) signal, and the unmodulated carrier for carrier synchronization can be obtained by averaging the phase angle over a given interval of frequency shift. After the preamble, modulation removal is performed on the staggered bit sequences by multiplying quadrature components of the received transmissions by the bit decisions Â and B̂ made by the detection circuitry. The desired waveform for symbol synchronization is achieved by filtering the upper sideband of a conventional delay-and-multiply circuit and demodulating the filtered upper sideband with a coherent carrier which is available by the time the end of the preamble is reached.

BRIEF DESCRIPTION OF THE DRAWINGS

The present invention will be more clearly understood from the following description in conjunction with the accompanying drawings in which.

DETAILED DESCRIPTION OF THE INVENTION

Figure 1:
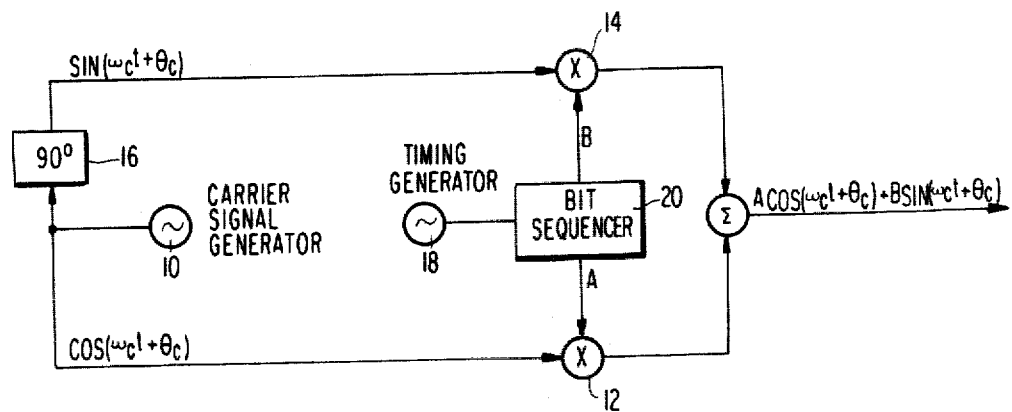
FIG. 1 is a simplified block diagram of a QPSK modulation technique.
Figure 2:
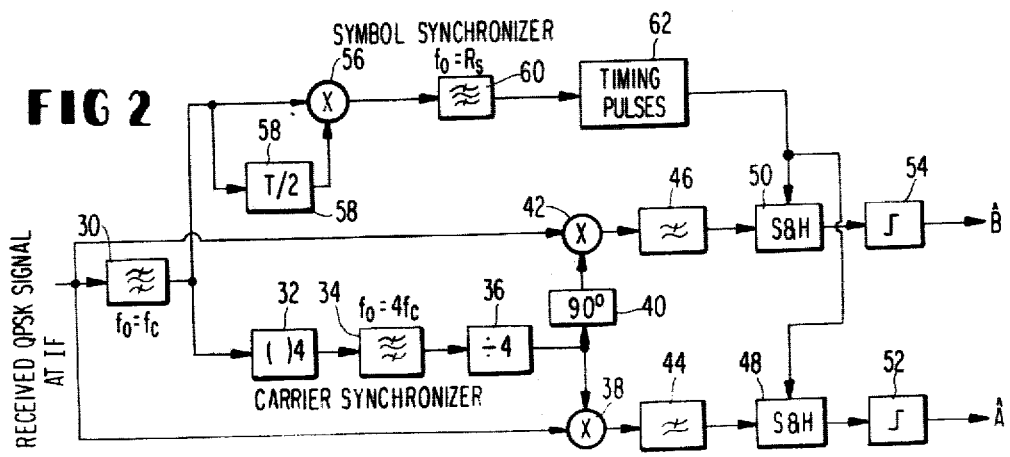
FIG. 2 is a block diagram of a synchronization scheme employed in conjunction with conventional TDMA/QPSK transmissions.

During the preamble, the phase alternation between $+\pi/4$ and $-\pi/4$ is achieved by the use of a constant $+1$ value for one bit sequence and an alternating $+1$, $-1$ set of values for the other bit sequence. The average phase of the carrier will be 0, corresponding to an unmodulated carrier. Filtering of the transmission to restrict its bandwidth will result in a fairly smooth phase function that changes by $\pi/2$ during an interval T, where $R_b=1/T$ is the bit rate and $T_s=2T$ is a quaternary symbol interval.

For offset-QPSK, the signal representation is that of staggered bit sequences A and B modulated onto quadrature carriers. Let C denote the power level of an unmodulated carrier. Then, $$S(t) = \sqrt{C}\,[A \cos \omega_c t + B \sin \omega_c t]$$

Since $A=+1$ and B alternates between $+1$ and $-1$ during the preamble, the alternating values of the bit sequence B will cancel one another and only the in-phase carrier will have an average value and contribute to carrier synchronization. For a linear channel, only one-half of the total power would be available for carrier synchronization during the preamble. However, with filtering in the channel, the sequence B will be converted onto an almost sinusoidal voltage and, with envelope limiting, there will be an increase in the power of the in-phase channel that accompanies suppression of the B levels. Accordingly, more than one-half of the power is in the in-phase component A.

With filtering and limiting, the offset-QPSK transmission will have a constant envelope and can be represented as:

$$S(t) = \sqrt{2C}\,\cos(\omega_c t + \theta)$$

During the preamble, $\theta$ will have a 0 mean as it passes back and forth between $-\pi/2$ and $+\pi/2$. With this alternating phase, the constant envelope and band limiting imposed by envelope limiting and filtering will cause the offset-QPSK signal to approximate continuous-phase FSK. Because the 90 degree phase shift takes place over an interval T of one FSK symbol, a cycle of 360 degrees corresponds to 4T or $2T_s$, and the frequency shift is $\pm R_b/4$.

The carrier phase may be approximated as a linear function during an interval of a given frequency shift. Assume that over each interval of length T:

$$\theta(t) = (-1)^n \frac{\pi\, t - nT}{2T} - \frac{\pi}{4}$$

where
$$nT \leq t \leq (n+1)T$$

It suffices to average cosine $\theta$ over any of these intervals to determine the fraction of carrier voltage that is directed along the X axis. This average value $\overline{X}$ is the amount of residual unmodulated carrier that is effective for carrier phase synchronization during the phase transition intervals.

$$\bar{X} = \sqrt{CE} \, [\cos \theta] = \sqrt{C} \, \frac{1}{T} \int_0^T \cos\left(\frac{\pi}{2} \frac{t}{T} - \frac{\pi}{4}\right) dt$$

$$\therefore \bar{X} = \sqrt{C} \, \frac{2}{\pi} \left[\sin\left(\frac{\pi}{2} \frac{t}{T} - \frac{\pi}{4}\right)\right]_0^T = \frac{2\sqrt{2}}{\pi} \sqrt{C}$$

The power loss factor is $8/\pi^2$ during each interval T of phase transition, as obtained from the square of the voltage factor. Thus, all but approximately one dB of the power will be unmodulated during the transition regions. Each phase shift of $\pm 90°$ requires approximately an interval T under the band limited conditions, but the phase then reaches steady-state and is approximately contant for an interval T. Only one-half of the total power is directed along the X axis during this constant interval. Thus, the average power available for carrier synchronization during the preamble is a fraction $0.5(0.5 + 8/90^2)$ of the total power C.

A filter tuned to the carrier fundamental can be used for the carrier synchronizer, and the phase delay of the tuned filter must be adjusted to an integer number of carrier cycles. During the preamble the filter can utilize the unmodulated carrier component, but after the preamble feedback of bit decisions Â and B̂ will be used as multipliers for modulation removal that adjusts the phase of the input to the filter. Because the carrier reference at $f_c$ is acquired from an unmodulated carrier component in the preamble, there is no phase ambiguity in this recovered carrier reference as there would be if squaring or double-squaring were required for modulation removal.

For symbol synchronization, all useful information is derived from transitions in the two bit streams A and B, each of which can take on value of $+1$ or $-1$. The amplitude X of the "in-phase" component of the carrier is $\sqrt{CA}$, where C is the total carrier power. Also, the amplitude Y of the "quadrature" component of the carrier is $\sqrt{CB}$. If we denote by lower-case letters x and y the X and Y waveforms delayed by $T_s/2$, one-half of a quaternary symbol interval, both xX and yY will yield waveforms that have a component at the symbol rate that can be used for symbol synchronization.

Figure 3:
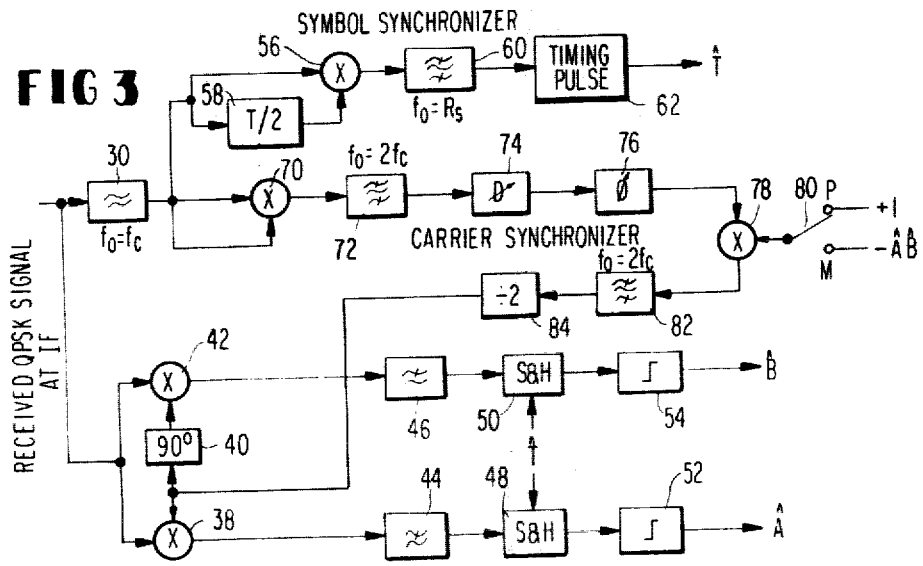
FIG. 3 is a block diagram of a TDMA/QPSK synchronization scheme that employs squaring and decision feedback for modulation removal.

For conventional QPSK where X and Y have coincident alignments, xX and yY have components at the symbol rate that add constructively, and (xX+yY) is a good synchronization waveform for conventional QPSK. This waveform is usually obtained by the use of a delay-and-multiply circuit, e.g. multiplier 56 and delay 58 in FIG. 3, in which the IF signal is multiplied by a delayed version of itself. The delay is approximately $T_s/2$ but is adjusted to yield a phase delay of an integer number of carrier cycles. Thus, the delay-and-multiply circuit results in a form of differentiallycoherent demodulation. The lower side band that yields the desired output has a phase equal to the difference of the two input phases.

Figure 4:
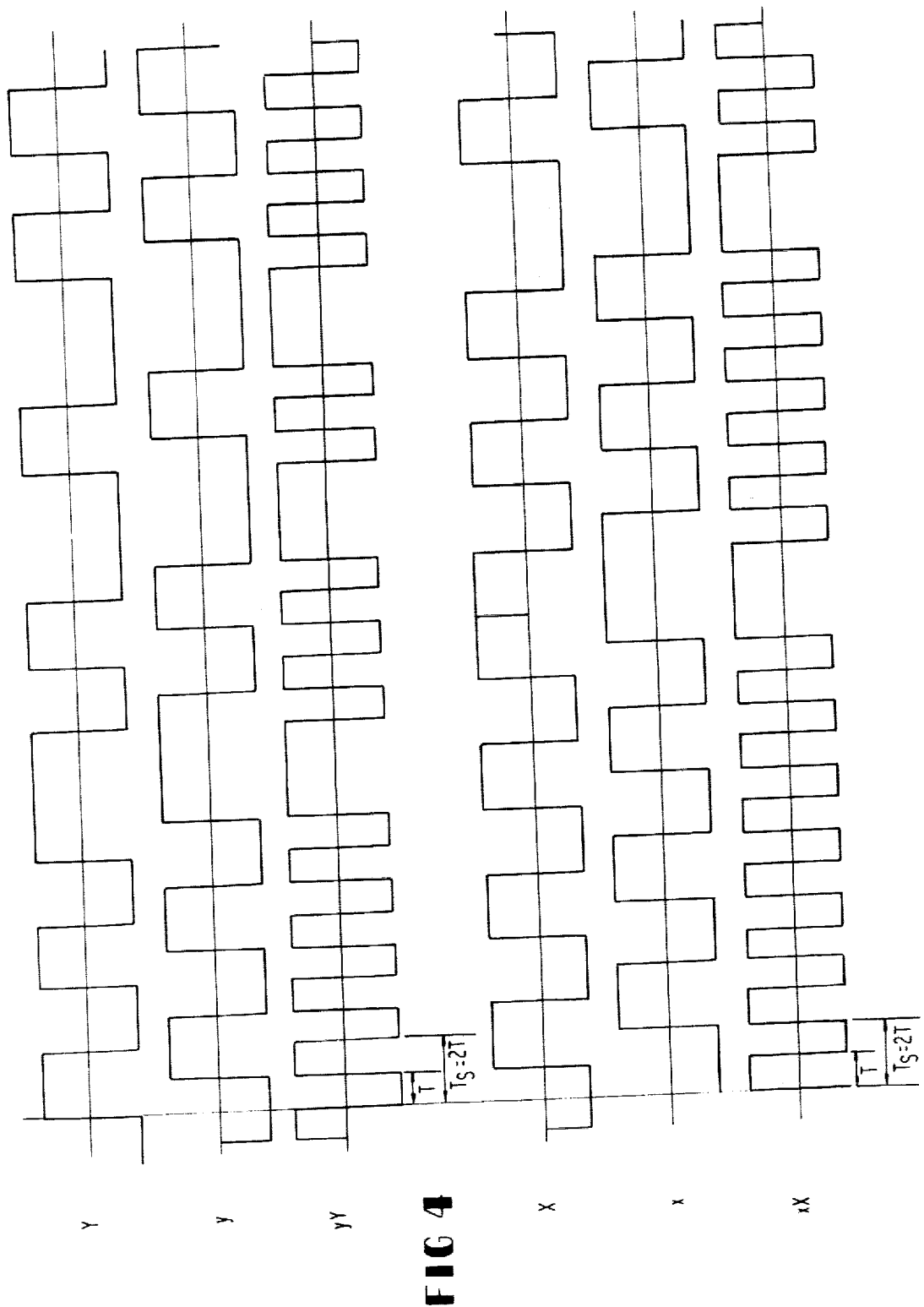
FIG. 4 includes illustrations of signal waveforms for use in describing the operation of the synchronizer of FIG. 5.

In offset QPSK, as briefly shown in FIG. 4 where xX and yY are plotted for two arbitrary bit sequences X and Y, the X and Y sequences have staggered alignments and xX and yY produce waveforms at the symbol rate that add destructively rather than constructively. Thus, (xX−yY) rather than (xX+yY) should be used for symbol synchronization, but (xX−yY) cannot be obtained from the lower sideband of the delay-and-multiply operation. As previously shown, (xX−yY) is the amplitude of the cosine carrier at the upper sideband of the delay-and-multiply operation, which is centered on the second harmonic of the carrier. Whereas the lower sideband yields (xX+yY), the upper sideband produces (xX−yY) cos $(2\omega_c t + 2\theta_c)$ and, thus, the desired waveform (xX−yY) must be translated to baseband before it can be used for symbol synchronization.

Coherent demodulation to obtain (xX−yY) at baseband for offset-QPSK would require carrier synchronization to be obtained prior to symbol synchronization, but this serial form of carrier phase and symbol timing acquisition is undesirable. Parallel acquisition is possible if the filtering of (xX−yY) can be implemented at RF before the coherent translation is required, as will be made clear from the following mathematical analysis.

Let $f_r = R_b/4 = R_s/2$ denote the magnitude of a frequency shift associated with a linear phase change of $90°$ over an interval T. As can be seen from FIG. 4, (xX−yY) produces a component at the symbol rate given by $\sin(2\omega_r t + 2\theta_r)$, where $2\omega_r = 4\pi f_r$ is the symbol angular frequency and $2\theta_r$ is the symbol phase angle. The upper sideband (USB) of the delay-and-multiply (D+M) operation yields:

$$S_M(t) = (xX - yY) \cos(2\omega_c t + 2\theta_c) + (xY + yX) \sin(2\omega_c t + 2\theta_c)$$

Note that the (xX−yY), the desired wavefore for symbol synchronization, is modulated onto cos $(2\omega_c t + 2\theta_c)$. The random term xY+yX is modulated onto sin $(2\omega_c t + 2\theta_c)$, but this component has no average value. Let $\epsilon$ denote the instantaneous value of (xX+yY). Then, $$S_M(t) \approx 2 \sin(2\omega_r t + 2\theta_r) \cos(2\omega_c t + 2\theta_c) + \epsilon \sin(2\omega_c t + 2\theta_c)$$

But, $$2 \sin a \cos b \triangleq + \sin(b+a) - \sin(b-a)$$

Therefore, $$S_M(t) \approx \epsilon \sin(2\omega_c t + 2\theta_c) - \sin(2\omega_c t + 2\theta_c - 2\omega_r t - 2\theta_r) + \sin(2\omega_c t + 2\theta_c + 2\omega_r t + 2\theta_r)$$

Note that USB of the D&M operation produces tones at twice the high and low tones of $f_c \pm f_r$, which happen to be the same tones used in another modulation technique known as minimum shift keying (MSK). Therefore, filters tuned to these tones may be used to improve the signal-to-noise ratio (SNR). Each filter must have a phase delay at its tone equal to an integer number of tone periods. The outputs of the two filters are summed to yield a filtered version of the USB of the D&M. Neglecting noise, the filters signal is:

$$\bar{S}_M = \frac{S_H + S_L}{2} = 2\sin(2\pi R_s t + \theta_s) \cos(2\omega_c t + 2\theta_c) + \epsilon_f \sin(2\omega_c t + 2\theta_c)$$

where the symbol rate $R_s = 1/T_s$, where $T_s = 2T$, is related to the frequency shift $f_r$ by:

$$2\pi R_s = 2\omega_r = 4\pi f_r$$

and the symbol timing phase $\theta_s$ is related to the phase angle $\theta_r$ by:

$$\theta_s = 2\theta_r$$

$\theta_s = 2\theta_r$ is the phase angle for symbol timing. In this expression, $\epsilon_f$ denotes the filtered value of $\epsilon = xY + yX$. This term will now be ignored because it is already very small and will be further suppressed by the coherent translation of $(xX - yY)$ to baseband with a reference $\cos(2\omega_c t + 2\theta_c)$.

Product demodulation of $S_M$ with a coherent reference at the second harmonic will yield the desired waveform for symbol synchronization. The reference waveform at the second harmonic can be obtained by frequency doubling of the output of the carrier synchronizer. Note that the carrier phase may not be acquired at the beginning of the preamble. Thus, the symbol timing waveform would not be obtained coherently then. However, symbol timing is not used until the end of the preamble, at which time the carrier reference will be practically coherent. Thus, the symbol timing waveform $S_T$ will be available when needed, as obtained from:

$$S_T = LSB [S_M \cos(2\omega_c t + 2\hat{\theta}_c)] = \cos 2\phi \sin(2\pi R_s t + \theta_s)$$

Where LSB denotes the lower sideband and $\phi = \theta_c - \hat{\theta}_c$ is the error in carrier phase synchronization.

Figure 5:
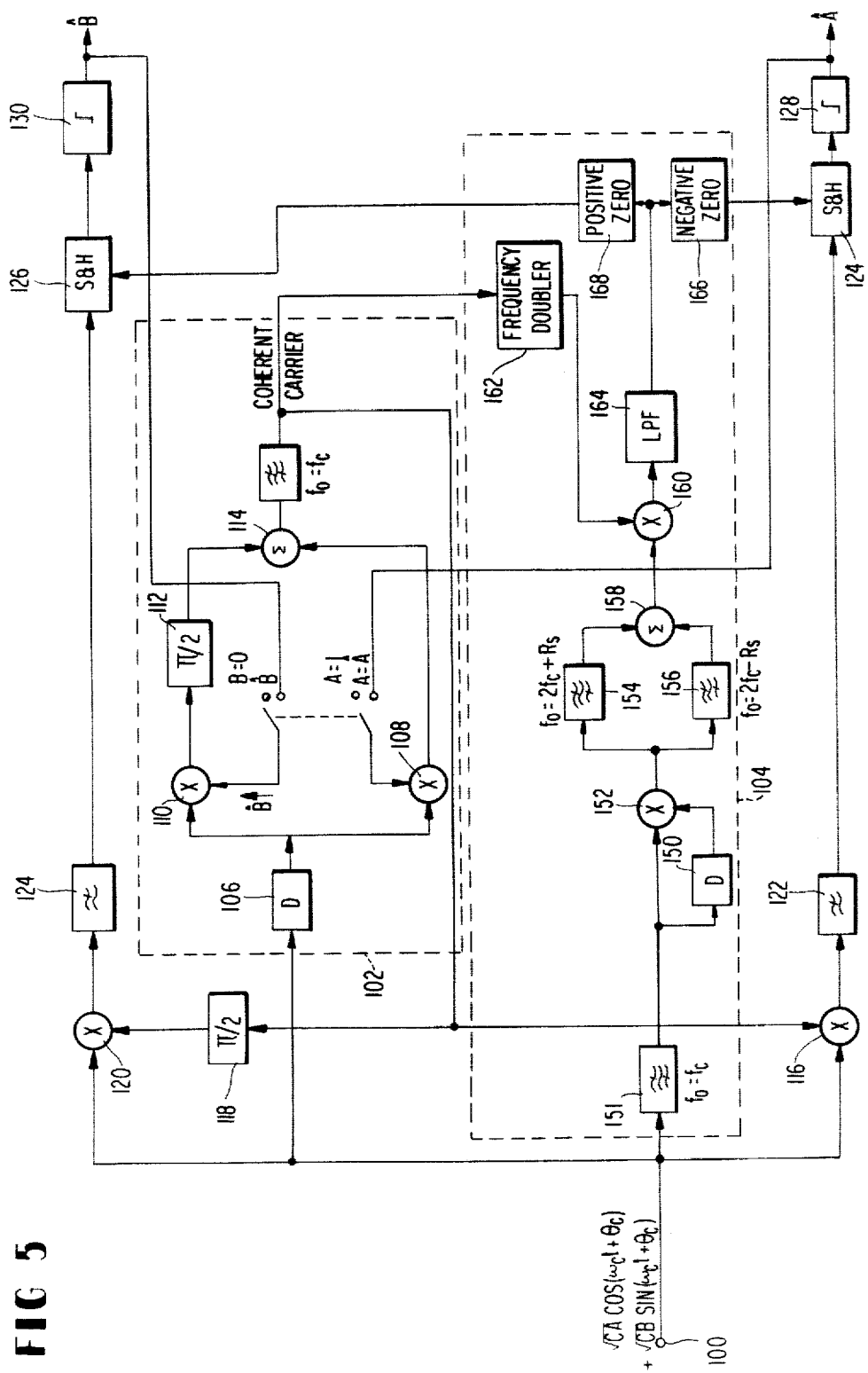
FIG. 5 is a brief block diagram of an offset-QPSK synchronization technique according to the present invention.

FIG. 5 is a block diagram of one embodiment of the offset QPSK carrier phase and symbol timing synchronization scheme according to the present invention. The offset QPSK signal is received at an input terminal 100 and is supplied as an input signal to both a carrier synchronizer section 102 and a symbol synchronizer section 104. In the carrier synchronizer section 102, the received O-QPSK signal is fed through a delay 106 to input terminals of multipliers 108 and 110. During the preamble, values of $\hat{B} = 0$ and $\hat{A} = 1$ are used for multipliers at the other inputs to multipliers 110 and 108, respectively. After the preamble, however, feedback of bit decisions $\hat{A}$ and $\hat{B}$ will be used as multipliers for modulation removal that adjusts the phase of the input to the filter. The delay 106 is necessary so that the decision feedback multipliers will be applied at the correct time interval. Also, TDMA system timing or other means must be used to determine when DFB should be employed, i.e. approximately when the end of the preamble occurs.

The output of multiplier 110 is supplied through a 90 degree phase shifter 112 to one input of an adder 114, the other input to which is received from the output of multiplier 108. The adder output is passed through a filter tuned to the carrier frequency, and the output of the filter is a coherent carrier reference which is provided to multiplier 116 and, through 90 degree phase shifter 118, to multiplier 120. Circuit elements introduce undesired delays and corresponding phase shifts in synchronization circuits. Although not shown in FIG. 5, phase adjustment of the output of the carrier synchronizer filter may be required to make the reference coherent with the O-QPSK transmission. This adjustment can be fixed once it is initially made.

By the end of the preamble, the coherent in-phase and quadrature carrier signals provided at the inputs to multipliers 116 and 120 will result in translation of the received QPSK signal to baseband, and the outputs of these multipliers 116 and 120 are provided through respective baseband filters 122 and 124. The baseband signals are then provided to respective sample-and-hold circuits 124 and 126 which are clocked by staggered sampling pulse sequences from the symbol synchronizer section 104. The threshold detectors 128 and 130 generate bit decisions based upon the instantaneous values within the sample and hold circuits, and these bit decisions $\hat{A}$ and $\hat{B}$ are fed back for use as inputs to multipliers 108 and 110 during the portion of the burst after the preamble.

For symbol timing synchronization, the received QPSK signal is also supplied to a delay-and-multiply circuit comprising delay element 150 and multiplier 152. The delay element 150 provides a delay of approximately $T_s/2$ that yields a phase delay of $2 n\pi$ radians. There will ordinarily be an IF filter 151 that restricts the spectral band to approximately the bandwidth of the received O-QPSK transmission. Such filtering is necessary in order to reduce the noise level prior to the D&M operation in the symbol synchronizer, thus minimizing the squaring loss. As shown previously, the upper sideband of the output of multiplier 152 includes tones at twice the high and low tones of an MSK signal, and this upper sideband is accordingly fed to a filter 154 tuned to twice the high MSK tone and a filter 156 tuned to twice the low MSK tone. The outputs of the filters 154 and 156 are summed in an adder 158 and provided to one input of a multiplier 160. The output of adder 158 constitutes the filtered signal $\bar{S}_M$ and, as described above, product demodulation of $\bar{S}_M$ with a coherent reference at the second harmonic will yield the desired waveform for symbol synchronization. Accordingly, the coherent reference from carrier synchronization section 102 is supplied through a frequency doubler 162 to obtain the second harmonic of the carrier, and the output of the frequency doubler is provided as the other input to mixer 160. Low pass filter 164 passes the lower side band of the output of mixer 160, with the output of filter 164 constituting the symbol timing waveform $S_T$. Zero crossing detectors 166 and 168 can be used to generate the sampling pulses or timing signals for the sample-and-hold circuits 124 and 126, respectively. The zero crossing detector 166 will provide a sampling pulse at every negative-going transition of the signal $S_T$, while the zero crossing detector 168 will provide a sampling pulse at every positive-going zero transition. There are unintentional phase shifts caused by various circuit components which may have to be countered, and although not illustrated in FIG. 5, phase adjustment circuits can be used where necessary. For instance, the phase of the symbol timing reference may require adjustment prior to the zero crossing detectors in order to insure that the zero crossings occur at the proper times for sampling.

As can be seen from the mathematical analysis given above and from the description of the preferred embodiment of the invention, carrier phase and symbol timing synchronization can be achieved according to the present invention without the need for excessively long preambles, since the coherent carrier and the symbol timing synchronization signal are derived in parallel. This is highly advantageous in rapidly acquiring carrier phase and symbol timing synchronization for offset QPSK burst communications. It should be appreciated that various changes could be made to the disclosed preferred embodiment of the invention without departing from the spirit and scope of the invention as defined in the following claims.

What is claimed is:

1. In a method of decoding offset-quaternary phase shift keying (O-QPSK) signal bursts, each burst including a preamble portion and a remaining message portion, said O-QPSK signal including first and second carriers in phase quadrature with one another and modulated with first and second bit sequences, respectively, to achieve first and second modulation waveforms, said method of decoding including combining said O-QPSK signal with a coherent carrier reference signal and a phase-delayed coherent carrier reference signal to thereby obtain said first and second modulation waveforms and sampling said first and second modulation waveforms with first and second symbol timing signals to obtain estimates said first and second bit sequences, said first bit sequence during said preamble having a constant value whereby said first carrier is unmodulated during said preamble, and said second bit sequence alternating between +1 and −1 values during said preamble, a method of generating said coherent carrier and said symbol timing signals comprising the steps of:
  filtering said O-QPSK signal during said preamble to obtain said coherent carrier reference signal;
  delaying said O-QPSK signal by substantially $T_s/2$ to obtain a delayed O-QPSK signal, where $T_s$ is the quaternary symbol interval;
  multiplying said O-QPSK and delayed O-QPSK signals to obtain a delay-and-multiply output signal having upper and lower sidebands;
  filtering said delay-and-multiply output signal to obtain said upper sideband thereof;
  frequency doubling said coherent carrier reference signal to obtain a doubled carrier;
  mixing said doubled carrier with said upper sideband to obtain a synchronization product having a lower sideband;
  filtering said synchronization product to obtain the lower sideband thereof; and
  deriving said first and second symbol timing signals from the lower sideband of said synchronization product, whereby said coherent carrier reference signal and symbol timing signal are derived substantially simultaneously during said preamble.

2. A method of generating coherent carrier reference and symbol timing signals as defined in claim 1, further comprising:
  delaying said O-QPSK signal;
  providing said delayed O-QPSK signal as a first input to first and second multipliers;
  feeding back estimates of the present values of said first and second bit sequences as second inputs to said first and second multipliers, respectively, during the remaining portion of said burst to remove the modulation from said first and second carriers;
  phase delaying the output of said second multiplier;
  combining said phase-delayed second multiplier output with the output of said first multiplier; and
  filtering the result of said combining step in order to obtain said coherent carrier.

3. A method of generating coherent carrier reference and symbol timing signals as defined in claim 2, wherein the second input to said first multiplier during said preamble is a constant value of 1, and the second input to said second multiplier during said preamble is a constant value of 0.

4. A method of generating coherent carrier reference and symbol timing signals as defined in claim 1, wherein said upper sideband of said delay-and-multiply output signal includes high and low components and said step of filtering said delay-and-multiply output signal comprise supplying said delay-and-multiply output signal as an input signal to each of first and second filters tuned to said high and low components, respectively, and combining the outputs of said first and second filters.

5. A method of generating coherent carrier reference and symbol timing signals as defined in claim 1, wherein the lower sideband of said synchronization product signal is at a frequency $R_s = 1/T_s$, where $T_s = 2T$, and said step of generating said first and second symbol timing signals from said synchronization product comprises supplying said synchronization product to first and second threshold-crossing detectors, the output of said first threshold-crossing detector providing said first symbol timing signal and the output of said second threshold-crossing detector providing said second symbol timing signal which is staggered in time with respect to said first symbol timing signal.

6. In an apparatus for decoding offset-quaternary phase shift keying (O-QPSK) signal bursts, each burst including a preamble portion and a remaining message portion, said O-QPSK signal including first and second carriers in phase quadrature with one another and modulated with first and second bit sequences, respectively, to obtain first and second modulation waveforms, said apparatus including means for combining said O-QPSK signal during said remaining message portion with a coherent carrier and a phase-delayed coherent carrier to thereby obtain said first and second modulation waveforms and sampling said first and second modulation waveforms with first and second symbol timing signals to obtain said first and second bit sequences, said first bit sequence during said preamble having a constant value whereby said first carrier is unmodulated during said preamble, and said second bit sequence alternating between +1 and −1 values during said preamble, said apparatus further comprising:
  filtering means for providing said coherent carrier reference signal at its output, said filtering means receiving said O-QPSK signal as its input during said preamble;
  delay means for delaying said O-QPSK signal by substantially $T = T_s/2$ to obtain a delayed O-QPSK signal, where $T_s$ is the quaternary symbol interval, said delay means also phase shifting said O-QPSK signal by $2n\pi$ radians, where $0 \leq n$;
  multiplying means for multiplying said O-QPSK signal and said delayed O-QPSK signal to obtain a delay-and-multiply output signal having upper and lower sidebands;
  second filtering means for filtering said delay-and-multiply output signal to obtain the upper sideband of said delay-and-multiply output signal;
  frequency doubling means for doubling the frequency of said coherent carrier reference signal to obtain a doubled carrier signal;
  means for mixing said doubled carrier signal with said upper sideband of said delay-and-multiply output signal to obtain a synchronization product;
  third filtering means for filtering said synchronization product signal to obtain the lower sideband thereof; and
  means for generating said first and second symbol timing signals from the output of said third filtering means, whereby said coherent carrier reference and symbol timing signals are generated substantially simultaneously during said preamble.

7. An apparatus as defined in claim 6, further comprising: second delay means for delaying said O-QPSK signal; first and second multipliers each having first and second inputs and an output and receiving the output of said second delay means as a first input signal;

means for supplying the present values of said first and second bit sequences as the second inputs to said first and second multipliers, respectively, during said remaining message portion of said O-QPSK bursts;

means for phase-delaying the output of said second multiplier;

combining means for combining the output of said phase delaying means with the output of said first multiplier, the output of said combining means being provided as the input to said first filtering means.

8. An apparatus as defined in claim 7, further comprising means for supplying a constant value of 0 and a constant value of 1 as the second inputs to said second and first multipliers, respectively, during said preamble.

9. An apparatus as defined in claim 6, wherein the output of said first multiplying means includes high and low components, and said second filtering means comprises two filters tuned to said high and low components, respectively, and each receiving its input from the output of said first multiplier, and means for combining the outputs of said two filters, the output of said means for combining being provided as an input to said mixing means.

10. An apparatus as defined in claim 6, wherein the output of said third filtering means is at a frequency of $R_s = 1/T_s$, where $T_s = 2T$, and said means for generating said first and second symbol timing signals from said third filtering means output comprises first and second threshold crossing detectors, said first threshold-crossing detector providing said first symbol timing signal and said second threshold-crossing detector providing said second symbol timing signal which is staggered in time with respect to said first symbol timing symbol.

* * * * *